P. RUDOLPH.
QUADRUPLE LENS OBJECTIVE.
APPLICATION FILED OCT. 4, 1910.

1,021,337.
Patented Mar. 26, 1912.

Witnesses:
Paul Krüger
Richard Hahn

Inventor:
Paul Rudolph

UNITED STATES PATENT OFFICE.

PAUL RUDOLPH, OF JENA, GERMANY, ASSIGNOR TO THE FIRM OF CARL ZEISS, OF JENA, GERMANY.

QUADRUPLE-LENS OBJECTIVE.

1,021,337.      Specification of Letters Patent.      Patented Mar. 26, 1912.

Application filed October 4, 1910. Serial No. 585,229.

*To all whom it may concern:*

Be it known that I, PAUL RUDOLPH, a citizen of the German Empire, residing at Carl-Zeiss strasse, Jena, in the Grand Duchy of Saxe-Weimar, Germany, have invented a new and useful Quadruple-Lens Objective, of which the following is a specification.

Figure 1:
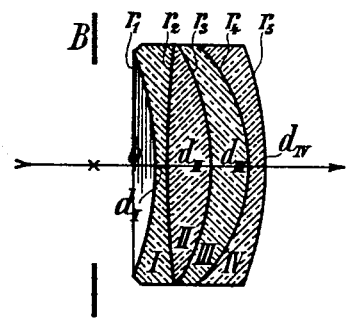

The invention consists in an improvement of the single objective shown in Figures 1 and 3 of the specification 532,398 and composed of four lenses cemented together, which was designed by Dr. Rudolph in 1895 as the first anastigmatic single objective and has been supplied since then by the firm Zeiss under the designation Series VII (Protar-lens 1:12.5). In this objective, of the three cemented surfaces the front one (facing the diaphragm) is convex toward the front and collective, the middle one is concave toward the front and collective and the rear one is concave toward the front and dispersive. The front lens has a concave front surface, and the rear lens is dispersive with a convex hinder surface. Hence the front lens is bi-concave, the second bi-convex, the third concavo-convex and collective and the dispersive, rear lens also concavo-convex.

According to the present invention a more perfect correction of the aforesaid single objective is rendered possible by a highly refractive glass being chosen for the third lens, a glass, the index $n_D$ of which amounts to at least 1.57, while in the construction hitherto used this index was 1.51. The improvement in the correction may be directed to increasing the luminosity, diminishing the spherical zones or more completely removing the astigmatism. In a correspondingly less degree the benefit of the said improvement can be given to two of these objects or to all three. At the same time, there is incidental to the invention a lessening of the average curvature of the lens surfaces, whereby the manufacture of the objective is facilitated.

Figure 2:
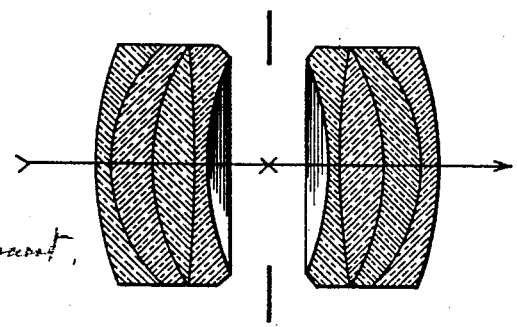

In the annexed drawings Fig. 1 represents an objective constructed according to the invention. Fig. 2 represents a double objective, in which the objective according to Fig. 1 is made use of for both components.

The constructional example shown in Fig. 1 is explained in the tables below. This objective is further corrected chromatically and with regard to the sine condition. Its relative aperture is 1:12.5.

The radii and thicknesses of the lenses I, II, III and IV as also the distance of the lens I from the front diaphragm B are enumerated in the first table. They apply to the focal length 100. The second table characterizes the kinds of glass by the refractive index $n_D$ and the index $n_G'$ for the H$\gamma$- line of the hydrogen spectrum.

*Radii, distance and thickness.*

$r_1 = -12.0$    $b = 2.34$
$r_2 = +44.2$    $d_I = 0.48$
$r_3 = -9.3$    $d_{II} = 1.70$
$r_4 = -6.6$    $d_{III} = 1.50$
$r_5 = -13.4$    $d_{IV} = 0.66$

*Kinds of glass.*

|      | $n_D$  | $n_G'$ |
|------|--------|--------|
| I:   | 1.4979 | 1.5074 |
| II:  | 1.6227 | 1.6308 |
| III: | 1.5813 | 1.5952 |
| IV:  | 1.6275 | 1.6487 |

I claim:

1. Single objective composed of four lenses cemented together, the front cemented surface being convex toward the front and collective, the middle one concave toward the front and collective, and the rear one concave toward the front and dispersive, the front lens having a concave front surface and a smaller index $n_D$ than 1.52, the rear lens being dispersive, with a convex hinder surface, and having an index $n_D$ not smaller than 1.58, and the index $n_D$ of the third lens being at least 1.57.

2. Double objective comprising as a component a single objective composed of four lenses cemented together, the front cemented surface being convex toward the front and collective, the middle one concave toward the front and collective and the rear one concave toward the front and dispersive, the front lens having a concave front surface and a smaller index $n_D$ than 1.52, the rear lens being dispersive, with a convex hinder surface, and having an index $n_D$ not smaller than 1.58, and the index $n_D$ of the third lens being at least 1.57.

PAUL RUDOLPH.

Witnesses:
  PAUL KRÜGER,
  RICHARD HAHN.